(12) United States Patent
Ookawara

(10) Patent No.: US 8,948,514 B2
(45) Date of Patent: Feb. 3, 2015

(54) ELECTRONIC DEVICE AND METHOD FOR PROCESSING HANDWRITTEN DOCUMENT

(71) Applicant: Kabushiki Kaisha Toshiba, Tokyo (JP)

(72) Inventor: Yasuhiro Ookawara, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 13/769,003

(22) Filed: Feb. 15, 2013

(65) Prior Publication Data

US 2014/0147047 A1    May 29, 2014

(30) Foreign Application Priority Data

Nov. 28, 2012  (JP) .................................. 2012-259558

(51) Int. Cl.
  *G06K 9/00*  (2006.01)
  *G06K 9/18*  (2006.01)
(52) U.S. Cl.
  CPC .......................................... *G06K 9/18* (2013.01)
  USPC .......................................................... 382/189
(58) Field of Classification Search
  USPC .............. 345/17; 382/187, 189, 229; 705/268
  See application file for complete search history.

(56) References Cited

U.S. PATENT DOCUMENTS

| 5,698,822 | A | * | 12/1997 | Haneda et al. | ............. | 178/18.01 |
| 2001/0043743 | A1 | * | 11/2001 | Sakaguchi et al. | ............. | 382/225 |
| 2002/0071607 | A1 | * | 6/2002 | Kawamura et al. | ............. | 382/187 |
| 2008/0240569 | A1 | * | 10/2008 | Tonouchi | ....................... | 382/186 |

FOREIGN PATENT DOCUMENTS

| JP | 58-096382 A | 6/1983 |
| JP | 07-085304 A | 3/1995 |
| JP | 07-271844 A | 10/1995 |
| JP | 07-287633 | 10/1995 |
| JP | 08-235377 | 9/1996 |
| JP | 2001-052174 A | 2/2001 |
| JP | 2011-059784 A | 3/2011 |

OTHER PUBLICATIONS

First Office Action mailed by Japan Patent Office on May 7, 2013 in the corresponding Japanese Patent Application 2012-259558.

* cited by examiner

*Primary Examiner* — Gregory F Cunningham
(74) *Attorney, Agent, or Firm* — Knobbe, Martens, Olson & Bear LLP

(57) ABSTRACT

According to one embodiment, an electronic device includes a recognition module, a modification module, and a display processor. The recognition module recognizes one or more figures from first stroke data corresponding to a plurality of strokes. The modification module modifies, if a plurality of a first kind of first figures are recognized from the first stroke data, second stroke data corresponding to the plurality of the first kind of the first figures to third stroke data corresponding to the first kind of a second figure. The display processor performs processing of displaying a locus corresponding to the third stroke data on a display.

9 Claims, 9 Drawing Sheets

ELECTRONIC DEVICE AND METHOD FOR PROCESSING HANDWRITTEN DOCUMENT

CROSS-REFERENCE TO RELATED APPLICATIONS

This application is based upon and claims the benefit of priority from Japanese Patent Application No. 2012-259558, filed Nov. 28, 2012, the entire contents of which are incorporated herein by reference.

FIELD

Embodiments described herein relate generally to handwritten document processing.

BACKGROUND

In recent years, various electronic devices, such as tablets, PDAs, and smartphones, have been developed. Most of such kinds of electronic devices include a touch screen display to facilitate an input operation by the user.

The user can provide an instruction to the mobile electronic device to execute a function related to a menu or object by touching the menu or object displayed on the touch screen display by a finger or the like.

However, most of existing electronic devices with a touch screen display are consumer products pursuing operability for various kinds of media data like images, music and others and are not necessarily suitable for use in business scenes like conferences, business negotiations, and product development. Thus, paper notebooks are still widely used in business scenes.

A method has been considered which stores handwriting information including a plurality of stroke data items corresponding to a plurality of strokes, respectively, handwritten on a touchscreen display in place of a paper notebook. It considers making a figure legible by recognizing a figure from a plurality of stroke data items, and tracing the recognized figure.

When there are figures which are overlapping, the figures overlap and are displayed, the figures may become hard to see on the contrary.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic device includes a recognition module, a modification module, and a display processor. The recognition module is configured to recognize one or more figures from first stroke data corresponding to a plurality of strokes. The modification module is configured to modify, if a plurality of a first kind of first figures are recognized from the first stroke data, second stroke data corresponding to the plurality of the first kind of the first figures to third stroke data corresponding to the first kind of a second figure. The display processor is configured to perform processing of displaying a locus corresponding to the third stroke data on a display.

Figure 1:
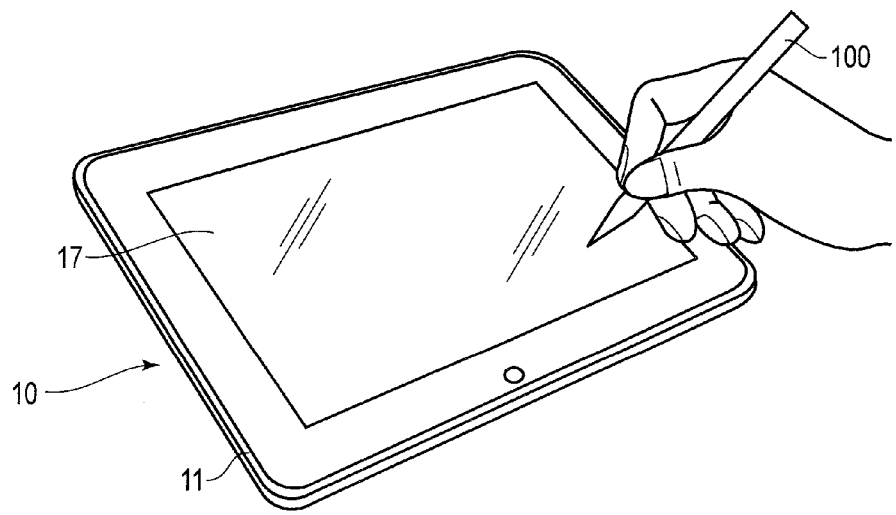
FIG. 1 is an exemplary perspective view illustrating an appearance of an electronic device according to an embodiment.

FIG. 1 is a perspective view showing an appearance of a tablet computer 10 according to an embodiment. The tablet computer 10 is a mobile electronic device that is also called a tablet or a slate computer. The tablet computer 10 includes a main body 11 and a touch screen display 17 as illustrated in FIG. 1. The touch screen display 17 is mounted so as to overlap with a top surface of the main body 11.

The main body 11 has a thin box casing. A flat panel display and a sensor configured to detect a contact position of a pen or a finger on the screen of the flat panel display are incorporated in the touch screen display 17. For example, the flat panel display may be a liquid crystal display (LCD). For example, an electrical capacitance touch panel or electromagnetic induction type digitizer can be used as a sensor. In the following description, it is assumed that two sensors of a digitizer and a touch panel are incorporated into the touch screen display 17.

Each of the digitizer and touch panel is provided so as to cover the screen of the flat panel display. The touch screen display 17 can detect not only a touch operation on the screen using the finger, but also a touch operation on the screen using a pen 100. For example, the pen 100 may be an electromagnetic induction pen. The user can perform a handwritten input operation on the touch screen display 17 using an external object (the pen 100 or the finger). A locus of movement of the external object (the pen 100 or the finger) on the screen, namely, a locus (handwriting) of a stroke written by a hand through a handwritten input operation is drawn in real time during the handwritten input operation, whereby the locus of each stroke is displayed on the screen. The locus of the movement of the external object during contact of the external object with the screen corresponds to a stroke. A set of many strokes corresponding to handwritten characters or figures, namely, a set of many trajectories (handwriting) constitutes a handwritten document.

In the embodiment, the handwritten document is stored in a storage medium as not image data but a coordinate series of the trajectories of the strokes and time-series information indicating an order relationship between strokes. The time-series information will be described in detail later with reference to FIG. 3. The time-series information generally means a set of time-series stroke data items corresponding to the plural strokes. Each stroke data item corresponds to a certain stroke. The stroke data may be data that can express the locus of the stroke, and contains a coordinate data series (a time-series coordinate) corresponding to each point on the locus of the stroke. The sequence of the stroke data items corresponds to the order in which each stroke is written by hand, namely, the order of strokes in handwriting.

The tablet computer 10 can read any existing time-series information items from the storage medium, and display the handwritten document corresponding to the time-series information, namely, the locus corresponding to each of the strokes indicated by the time-series information on the screen.

In the embodiment, the time-series information (the handwritten document data) can be managed as one or plural pages. In this case, the time-series information (the handwritten document data) may be split in area units that falls within a screen to record a chunk of time-series information that falls within a screen as a page. Alternatively, the page size may be variable. In this case, because the page size can be widened to an area larger than a screen size, the handwritten document having the area larger than the screen size can be dealt with as a page. When a whole of a page cannot simultaneously be displayed on the display, the page may be reduced or a display target portion of the page may be moved by vertical and horizontal scrolling.

The relationship between the stroke (such as a character, a mark, and a figure) handwritten by a user and the time-series information will be described below with reference to FIGS. 2 and 3. FIG. 3 illustrates an example of the handwritten document (a handwritten character string) that is handwritten on the touch screen display 17 using the pen 100.

In the handwritten document, frequently another character or another figure is handwritten on an already-handwritten character or figure. In FIG. 2, it is assumed that a handwritten character string "ABC" is handwritten in the order of "A", "B", and "C" and then an arrow is handwritten close to the handwritten character "A".

The handwritten character "A" is expressed by two strokes (the locus of a "^" shape and the locus of a "-" shape) handwritten using the pen 100, namely, by the two trajectories. The locus of the "^" shape handwritten at first with the pen 100 is sampled in real time, for example, at equal intervals, thereby obtaining time series coordinates SD11, SD12, . . . , SD1n of strokes having the "^" shape. Similarly, the locus of the "-" shape handwritten with the pen 100 is sampled, thereby obtaining time series coordinates SD21, SD22, . . . , SD2n of strokes having the "-" shape.

The handwritten character "B" is expressed by the two strokes handwritten using the pen 100, namely, by the two trajectories. The handwritten character "C" is expressed by the stroke handwritten using the pen 100, namely, by the locus. The handwritten "arrow" is expressed by the two strokes handwritten using the pen 100, namely, by the two trajectories.

Figure 2:
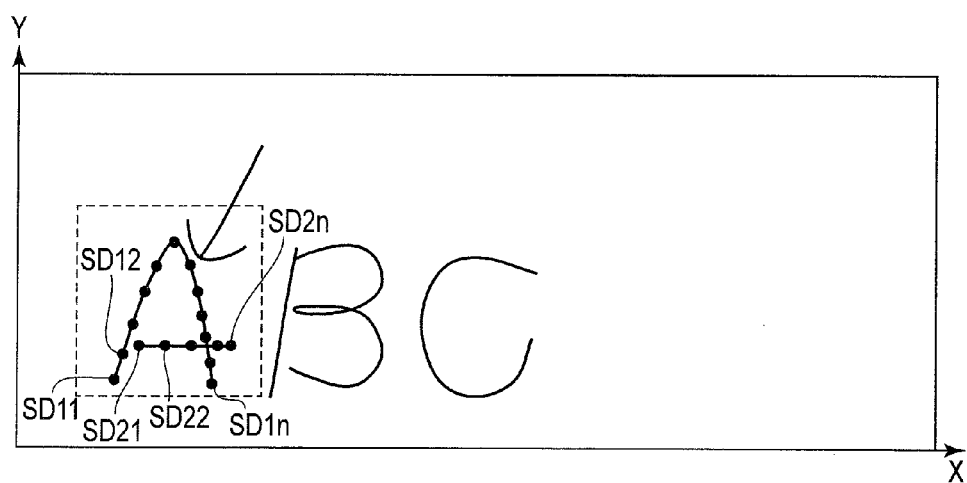
FIG. 2 is an exemplary view illustrating an example of a handwritten document written by hand on a touch screen display of the electronic device of the embodiment.
Figure 3:
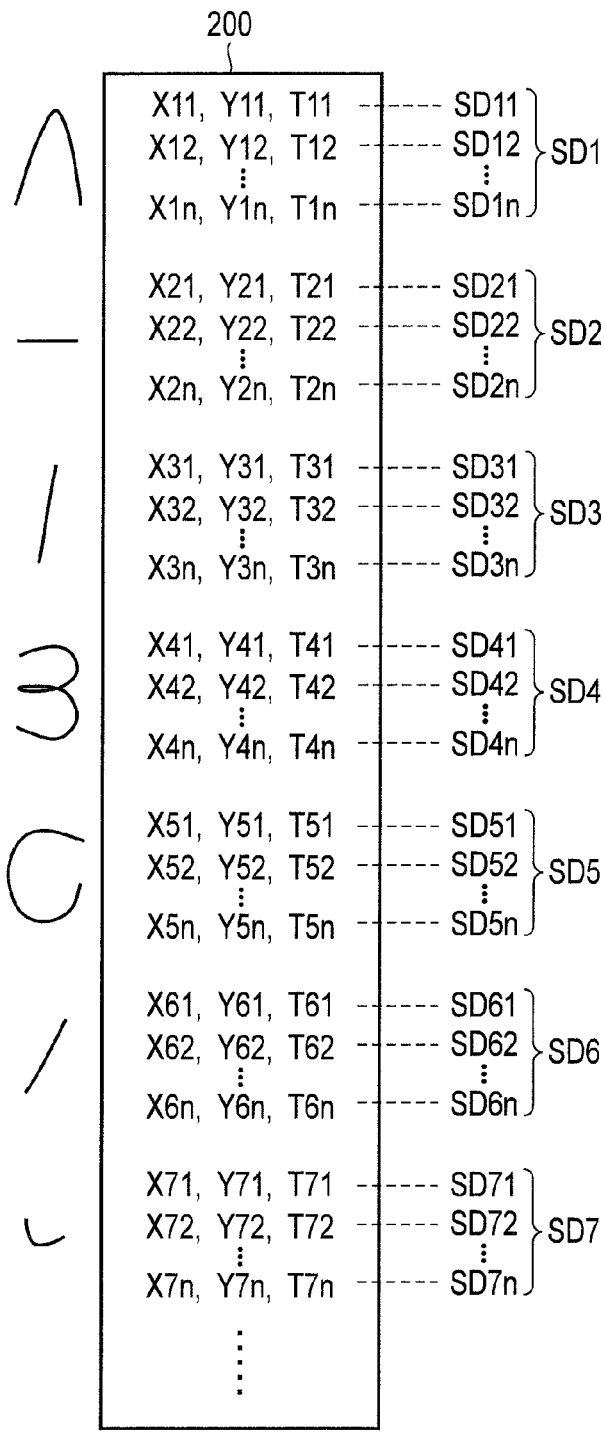
FIG. 3 is an exemplary view illustrating time-series information, which is stored in a storage medium by the electronic device of the embodiment and corresponds to the handwritten document in FIG. 2.

FIG. 3 illustrates time-series information 200 corresponding to the handwritten document in FIG. 2. The time-series information contains plural stroke data items SD1, SD2, . . . , SD7. In the time-series information 200, the stroke data items SD1, SD2, . . . , SD7 are arranged in time series in the order of handwriting, namely, in the order in which the strokes are handwritten.

In the time-series information 200, the first two stroke data items SD1 and SD2 indicate two strokes of the handwritten character "A". The third and fourth stroke data items SD3 and SD4 indicate two strokes constituting the handwritten character "B". The fifth stroke data item SD5 indicates the stroke constituting the handwritten character "C". The sixth and seventh stroke data item SD6 and SD7 indicate two strokes constituting the handwritten "arrow".

Each stroke data item contains the coordinate data series (the times-series coordinates) corresponding to the stroke, namely, plural coordinates corresponding to the plural points on the locus of the stroke. In each stroke data item, the coordinates are arranged in time series in the order in which the stroke is written. For example, as to the handwritten character "A", the stroke data SD1 contains the coordinate data series (the time series coordinates) corresponding to the points on the locus of the stroke having the "^A" shape, namely, n coordinate data items SD11, SD12, . . . , SD1n. The stroke data SD2 contains the coordinate data series corresponding to the points on the locus of the stroke having the "-" shape in the handwritten character "A", namely, n coordinate data items SD21, SD22, . . . , SD2n. The number of coordinate data item may vary according to the stroke data.

Each coordinate data item indicates an X coordinate and a Y coordinate corresponding to a point existing in the corresponding locus. For example, the coordinate data SD11 indicates an X coordinate (X11) and a Y coordinate (Y11) at a starting point of the stroke having the "^" shape. The coordinate data SD1n indicates an X coordinate (X1n) and a Y coordinate (Y1n) at an ending point of the stroke having the "^" shape.

Each coordinate data item may contain time stamp information T corresponding to a time point when the point corresponding to the coordinate is handwritten. The time point of the handwriting may be an absolute time (for example, year, month, day, hour, minute, and second) or a relative time based on a certain time point. For example, the absolute time (for example, year, month, day, hour, minute, and second) when the stroke is started to be written may be added to each stroke data item as the time stamp information, and the relative time indicating a difference from the absolute time may be added to each coordinate data item in the stroke data as the time stamp information T.

The stroke data may include line width information indicating a line width and line type information indicating a line type. The line type information indicates a solid line, a broken line, a dotted line, and the like. The stroke data may include line color information illustrating a color of the line.

Thus, a temporal relationship between strokes can precisely be expressed using the time-series information in which the time stamp information T is added to each coordinate data item.

The time-series information 200 having the structure in FIG. 3 can express not only the handwriting of each stroke but also the temporal relationship between strokes. Accordingly, the use of the time-series information 200 can deal with the handwritten character "A" and a front end portion of the handwritten "arrow" as different characters or different figures, even if the front end portion of the handwritten "arrow" is written while overlapping with or being close to the handwritten character "A" as illustrated in FIG. 2.

The tablet computer 10 can read any existing time-series information item from the storage medium, and display the handwritten document corresponding to the time-series information, namely, the locus corresponding to each of the strokes indicated by the time-series information on the screen.

In the embodiment, the time-series information (the handwritten document data) may be managed as one or plural pages. In this case, the time-series information (the handwritten document data) may be split in area units that falls within a screen to record a chunk of time-series information that falls within a screen as a page. Alternatively, the page size may be variable. In this case, because the page size can be widened to an area larger than a screen size, the handwritten document having the area larger than the screen size can be dealt with as a page. When a whole of a page cannot simultaneously be displayed on the display, the page may be reduced or a display target portion of the page may be moved by vertical and horizontal scrolling.

Figure 4:
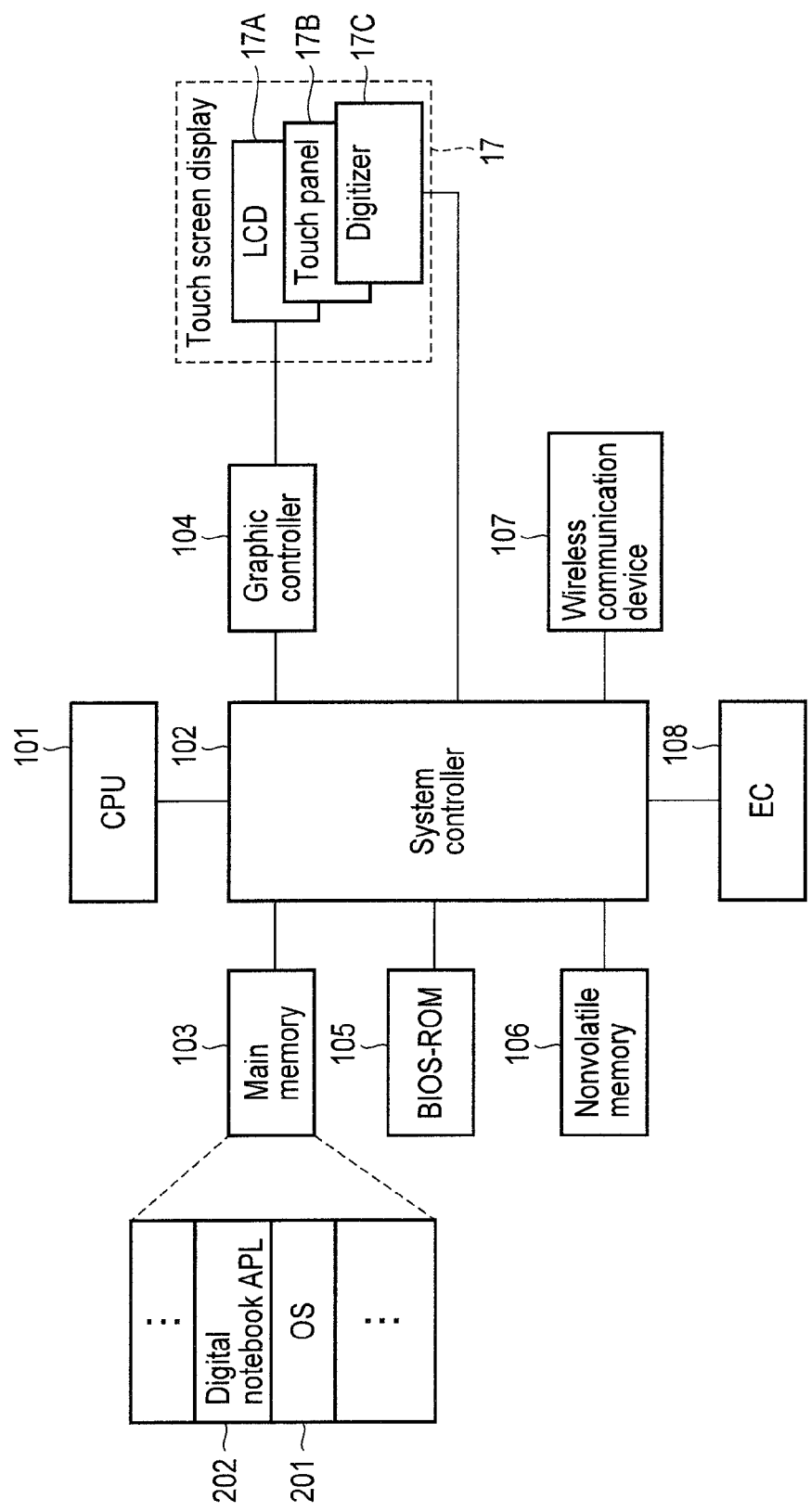
FIG. 4 is an exemplary block diagram illustrating a system configuration of the electronic device of the embodiment.

FIG. 4 is a view illustrating a system configuration of the tablet computer 10. As illustrated in FIG. 4, the tablet computer 10 includes a CPU 101, a system controller 102, a main memory 103, a graphic controller 104, a BIOS-ROM 105, a nonvolatile memory 106, a wireless communication device 107, and an embedded controller (EC) 108.

The CPU 101 is a processor that controls operations of various modules in the tablet computer 10. The CPU 101 executes various software items loaded onto the main memory 103 from the nonvolatile memory 106 that is of the storage device. The software items include an operating system (OS) 201 and various application programs. A digital notebook application program 202 is included in the application programs. The digital notebook application program 202 has a function of producing and displaying the handwritten document and a function of editing the handwritten document, and a function of recognizing the character and the figure.

The CPU 101 executes a basic input/output system (BIOS) stored in the BIOS-ROM 105. The BIOS is a program that controls hardware.

The system controller 102 is a device that connects a local bus of the CPU 101 and various components. The system controller 102 is provided with a memory controller that controls access to the main memory 103. The system controller 102 also has a function of conducting communication with the graphic controller 104 through a serial bus compatible with a PCI EXPRESS standard.

The graphic controller 104 is a display controller that controls an LCD 17A used as a display monitor of the tablet computer 10. A display signal generated by the graphic controller 104 is transmitted to the LCD 17A. The LCD 17A displays a screen image based on the display signal. A touch panel 17B and a digitizer 17C are arranged on the LCD 17A. The touch panel 17B is a capacitance type pointing device that performs input on the screen of the LCD 17A. The touch panel 17B detects the contact position on the screen with which the finger comes into contact and the movement of the contact position. The digitizer 17C outputs the coordinate indicating the contact position on the screen. The digitizer 17C is an electromagnetic induction type pointing device that performs the input on the screen of the LCD 17A. The digitizer 17C detects the contact position on the screen with which the pen 100 comes into contact and the movement of the contact position. The digitizer 17C outputs the coordinate indicating the position of the pen 100 on the screen.

The wireless communication device 107 is a device configured to conduct wireless communication, such as wireless LAN and cellar mobile communication. The EC 108 is a one-chip microcomputer that includes an embedded controller for power management. The EC 108 has a function of turning on and off the power of the tablet computer 10 in response to a power button operation performed by the user.

Figure 5:
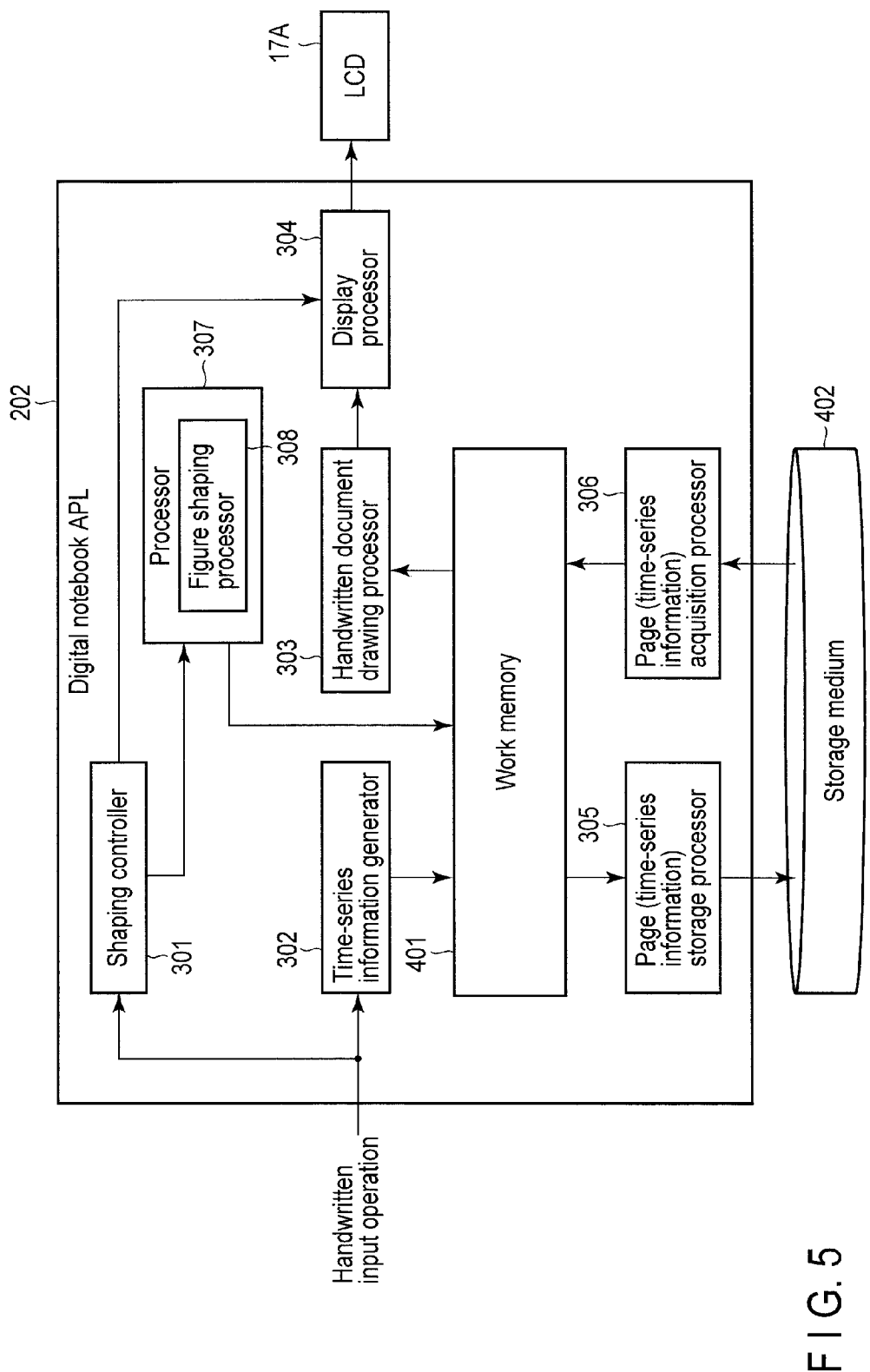
FIG. 5 is an exemplary block diagram illustrating a functional configuration of a digital notebook application program.

A functional configuration of the digital notebook application program 202 will be described below with reference to FIG. 5.

The digital notebook application program 202 includes a shaping controller 301, a time-series information generator 302, a handwritten document drawing processor 303, a display processor 304, a page storage processor 305, a page acquisition processor 306, and a processor 307.

The digital notebook application program 202 produces, displays, and edits the handwritten document by the use of the stroke data that is input with the touch screen display 17. The touch screen display 17 is configured to detect an occurrence of events, such as "touch", "movement (slide)", and "release". The "touch" is an event indicating that an external object comes into contact with the screen. The "movement (slide)" is an event indicating that the contact position moves while the external object is in contact with the screen. The "release" is an event indicating that the external object is released from the screen.

The shaping controller 301 performs processing of drawing a figure shaping button with which the user issues an instruction to for shaping processing. The shaping controller 301 transmits drawing data of the figure shaping button to the display processor 304. When the pen or the finger comes into contact with the figure shaping button, the shaping controller 301 makes a request to a figure shaping processor 308 to perform shaping processing.

The time-series information generator 302 receive the event of "touch" or "movement (slide)" generated by the touch screen display 17, thereby detecting a handwritten input operation. The "touch" event includes the coordinate of the contact position. The "movement (slide)" event includes the coordinate of the destination contact position. Accordingly, the time-series information generator 302 can receive the coordinate series corresponding to the locus of the movement of the contact position from the touch screen display 17.

The time-series information generator 302 receives the coordinate series output from the touch screen display 17, and generates the time-series information based on the coordinate series. The time-series information generator 302 may temporarily store the time-series information, namely, the coordinate data and the time stamp information, which correspond to each point of the stroke in a work memory 401.

The handwritten document drawing processor 303 analyzes the time-series information in the work memory 401, and performs processing of drawing the locus of each stroke indicated by the time-series information as the handwritten page based on the analysis result. The handwritten document drawing processor 303 draws the locus of the pen 100, namely, the locus of each stroke on the handwritten page while the pen 100 is in contact with the screen.

The display processor 304 draws a figure shaping button 501, which is drawn by the shaping controller 301, on the handwritten page drawn by the handwritten document drawing processor 303. The display processor 304 performs processing of producing data in order to display the handwritten document including the figure shaping button 501 on the LCD 17A.

Figure 6:
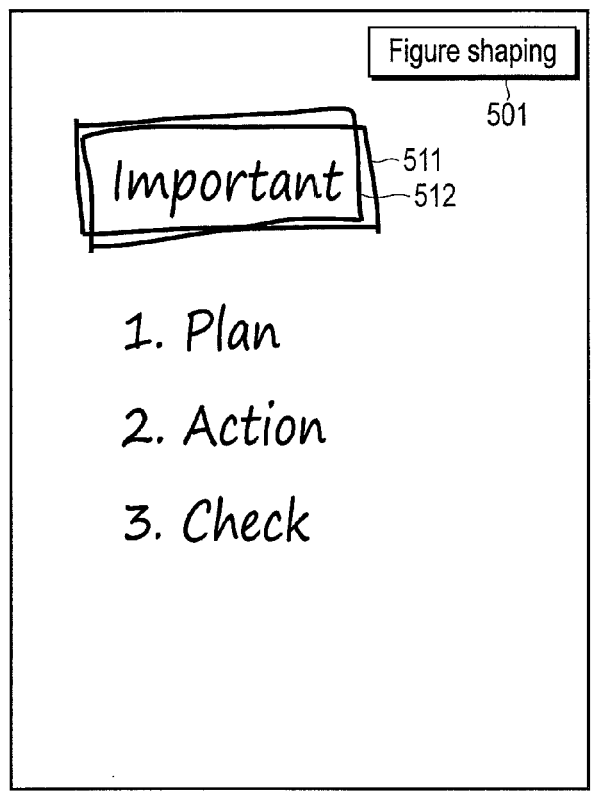
FIG. 6 is an exemplary view illustrating an example of a handwritten page.

FIG. 6 is a view illustrating an example of the handwritten page. The figure shaping button 501 is displayed in the handwritten page. When the pen or the finger comes into contact with the figure shaping button 501, the figure shaping processor 308 starts the processing. Handwritten characters "Important", "1.Plan", "2.Action", and "3.Check" and handwritten quadrangles 511 and 512 are manually input to the handwritten page.

The processor 307 performs various processing items, such as figure shaping processing, to the time-series information of a processing target. The processor 307 includes the figure shaping processor 308. The figure shaping processor 308 performs the processing of shaping the handwritten figure in the handwritten page. The figure shaping processor 308 recognizes handwritten figures, such as a circle, a triangle, and a quadrangle, from the handwritten page, and shapes the recognized handwritten figure.

Figure 7:
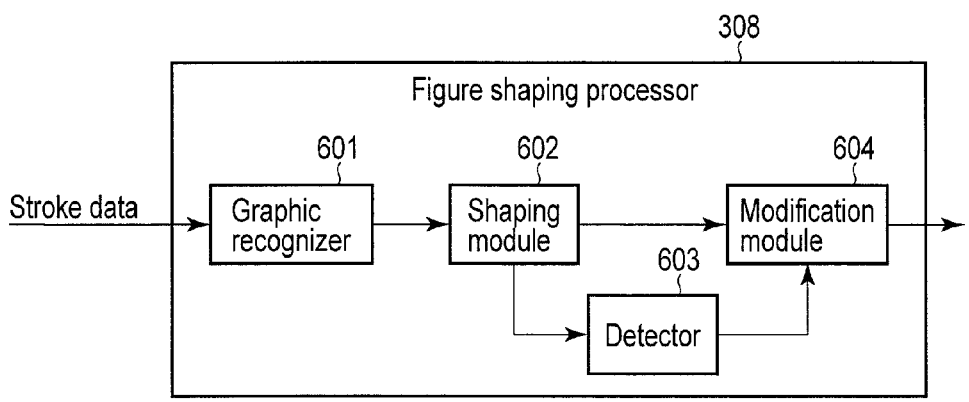
FIG. 7 is an exemplary block diagram illustrating a configuration of a graphic processor.

FIG. 7 is a block diagram illustrating a configuration of the figure shaping processor 308.

The figure shaping processor 308 includes a figure recognizer 601, a shaping module 602, a detector 603, and a modification module 604.

The figure recognizer 601 calculates a feature quantity based on the time-series information in the work memory 401. The feature quantity is calculated based on the coordinate data and the time stamp information, which correspond to each point in the time-series information and a change amount of the successive points. The figure recognizer 601 recognizes the kind and position of the figure in the handwritten page based on the calculated feature quantity. The figure recognizer 601 specifies the stroke data corresponding to the figure recognized from the time-series information. The figure recognizer 601 notifies the shaping module 602 of the kind and position of the recognized figure and stroke data information indicating the stroke data corresponding to the figure.

The shaping module 602 performs the processing of shaping the figure based on the notification from the figure recognizer 601. The shaped figure has no distortion. Polygons, such as the triangle and the quadrangle, are surrounded by straight lines. The circle is constructed by the trajectories of the points that are at the same distance from a center point.

Based on the notified stroke data information, the shaping module 602 deletes the stroke data corresponding to the recognized figure that is included in the time-series information stored in the work memory 401, and adds the stroke data corresponding to the recognized kind and position in the work memory 401.

Figure 8:
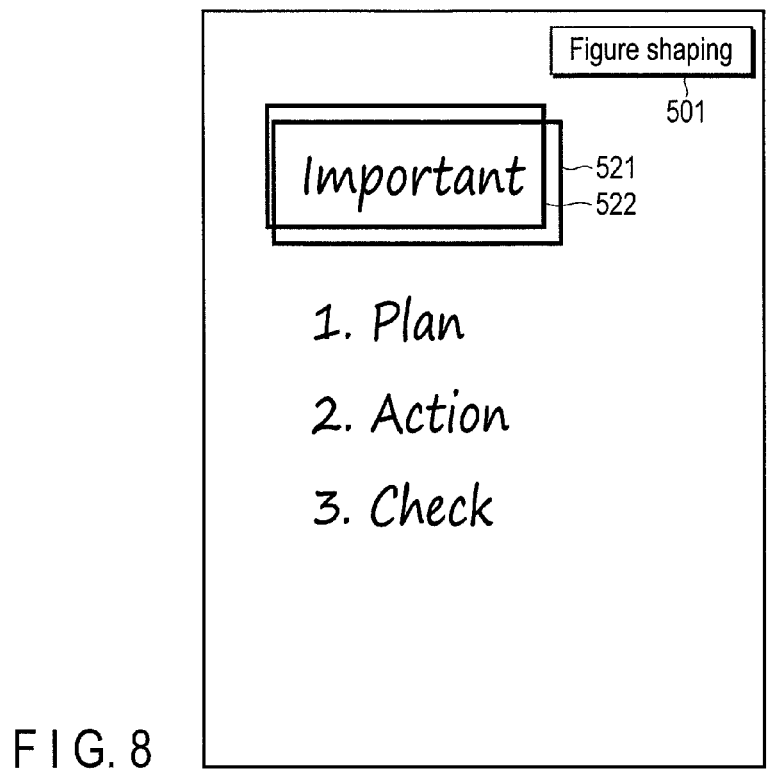
FIG. 8 is an exemplary view illustrating the handwritten page in a state in which a shaping module shapes a quadrangle.

FIG. 8 is a view illustrating the handwritten page in a state in which the shaping module 602 shapes the quadrangle. As illustrated in FIG. 8, shaped quadrangles 521 and 522 are displayed instead of the quadrangles 511 and 512. The handwritten page in FIG. 8 is not actually displayed.

The detector 603 detects the figure that is traced in the handwritten page including the figure shaped by the shaping module 602. When detecting the traced figure, the detector 603 notifies the modification module 604 of the position of the traced figure. For example, the detector 603 determines that the figure is traced when gravity centers of the same kind of the figures are less than a threshold while a distance between line segments adjacent to each other is less than a threshold.

The modification module 604 performs processing of changing the figures at the notified position to the same kind of the figure. The modification module 604 also performs processing of changing a display mode of the changed figure. The modification module 604 changes the line type of the figure in order to change the display mode. For example, the modification module 604 increases the line width. The modification module 604 may change the line to the broken line. The modification module 604 may change the line color.

The modification module 604 modifies the stroke data, which is included in the time-series information stored in the work memory 401 and corresponds to the traced figures, to the stroke data corresponding to the same kind of the figure in order to change the figures at the notified position to the same kind of the figure. Any modified stroke data may be used as long as the modified stroke data can be used to display the modified figure. A format of the modified stroke data may be identical to a format of the data input by the handwriting, or the format of the modified stroke data may be a format that is simplified according to a recognition result. The modification module 604 can change at least one of the line width information and the line type information, which are included in the stroke data, to the original figure. In the case that the stroke data includes the line color information, the line color information may be modified.

Figure 9:
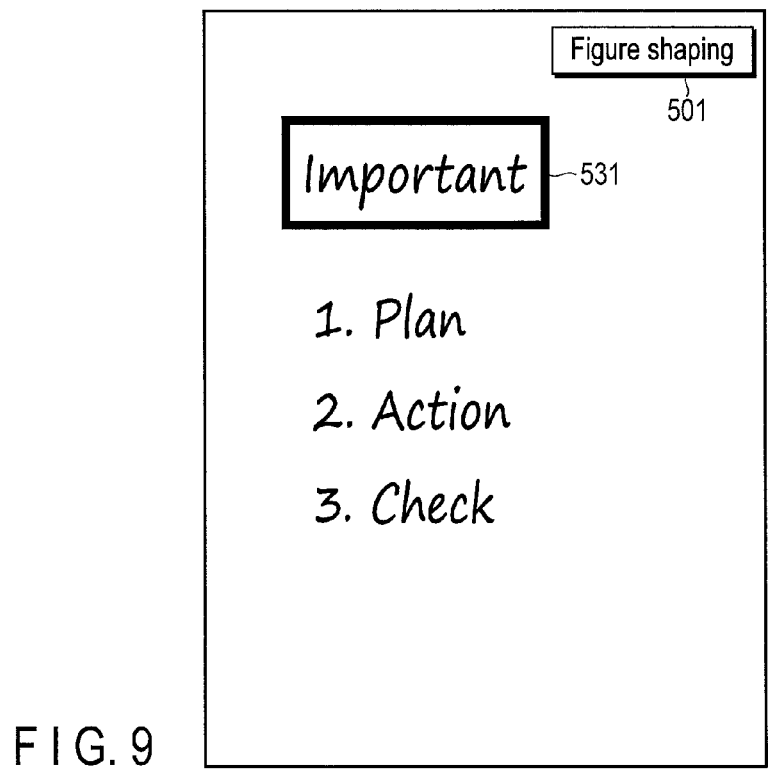
FIG. 9 is an exemplary view illustrating an example of the handwritten page including the quadrangle modified by a modification module.

FIG. 9 is a view illustrating an example of the handwritten page including the quadrangle modified by the modification module 604. As illustrated in FIG. 9, a quadrangle 531 having the large line width is displayed instead of the quadrangles 521 and 522.

Figure 10:
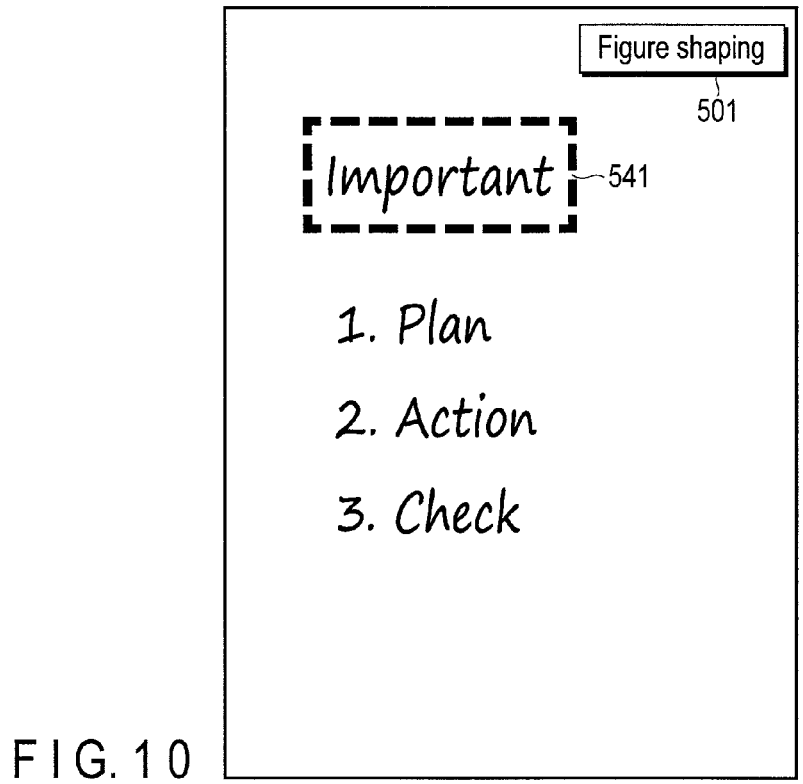
FIG. 10 is an exemplary view illustrating an example of the handwritten page including the quadrangle modified by the modification module.

FIG. 10 is a view illustrating an example of the handwritten page including the quadrangle modified by the modification module 604. As illustrated in FIG. 10, a broken-line quadrangle 531 having the large line width is displayed instead of the quadrangles 521 and 522.

Figure 11:
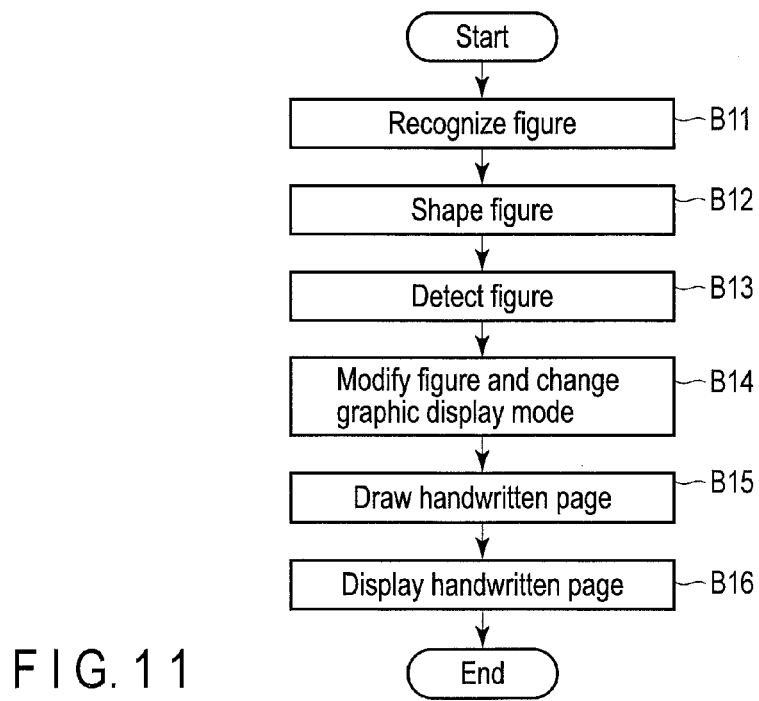
FIG. 11 is an exemplary flowchart illustrating a procedure of figure generating processing performed by a figure shaping processor and handwritten page displaying processing performed by a handwritten document drawing processor.

A procedure of the figure generating processing performed by the figure shaping processor 308 and the handwritten page displaying processing performed by the handwritten document drawing processor 303 will be described with reference to FIG. 11.

When the figure shaping button 501 is operated, the figure recognizer 601 recognizes the figure (Block B11). The shaping module 602 performs the processing of shaping the figure recognized by the figure recognizer 601 to the time-series information (Block B12). The detector 603 detects the traced figure (Block B13). The modification module 604 performs the processing of modifying the traced figures to the figure to the time-series information, and performs the processing of changing the display mode to the display mode different from that of the original figure (Block B14). The handwritten document drawing processor 303 performs the processing of drawing the handwritten page based on the time-series information (Block B15). The display processor 304 performs the processing of displaying the handwritten page on the LCD 17A based on the time-series information including the stroke data of the modified figure.

Figure 12:
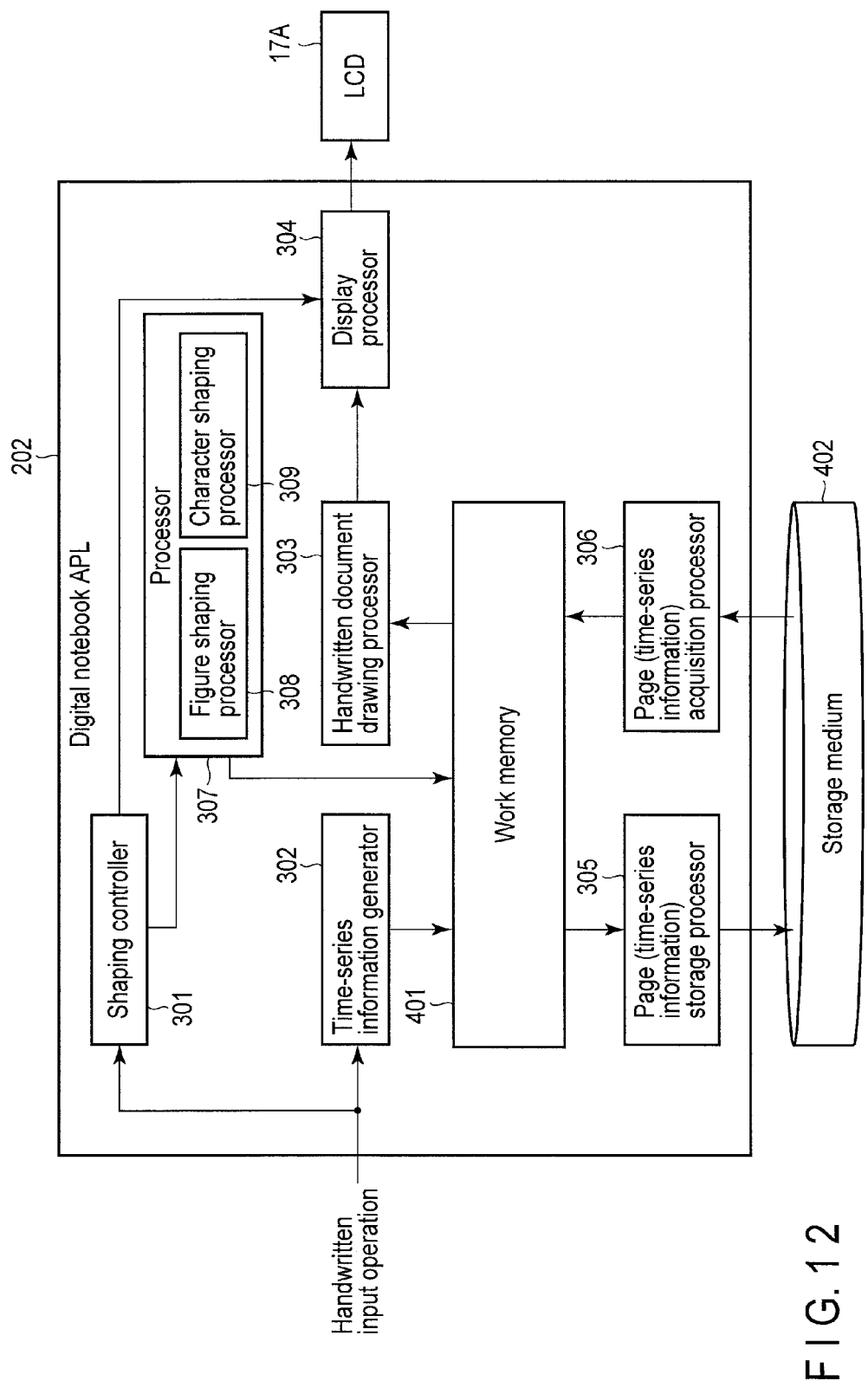
FIG. 12 is an exemplary block diagram illustrating a functional configuration of the digital notebook application program.

FIG. 12 is a view illustrating a modification of the system configuration of the electronic device.

A character shaping processor 309 performs processing of recognizing the handwritten characters to the characters handwritten in the currently-displayed time-series information (the handwritten page). The character shaping processor 309 replaces the handwritten characters with font characters based on the recognition result.

Figure 13:
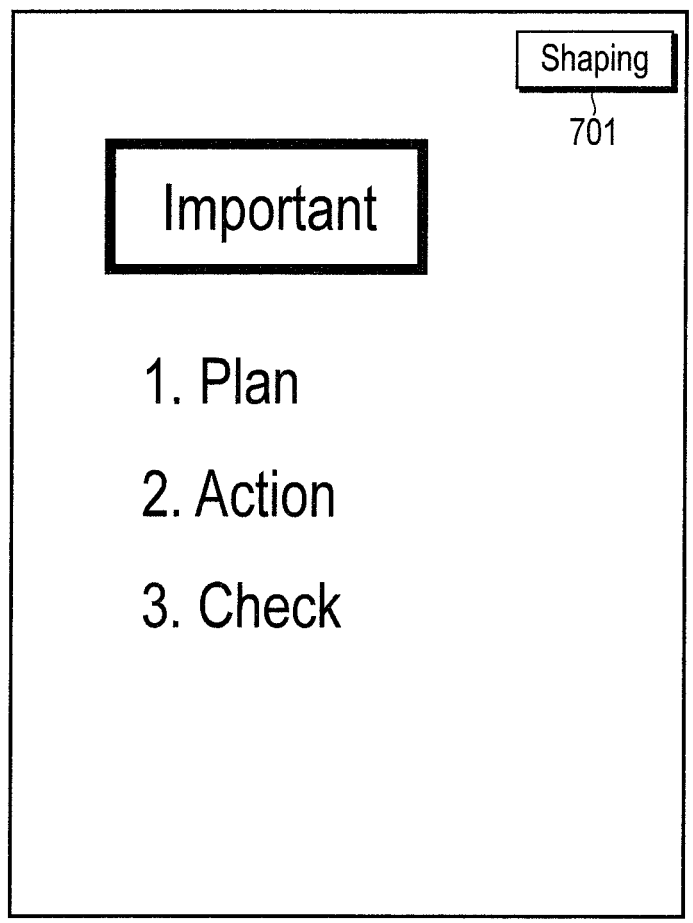
FIG. 13 is an exemplary view illustrating an example of the handwritten page.

FIG. 13 is a view illustrating the page in which the handwritten characters are replaced with the font characters. As illustrated in FIG. 13, the handwritten characters "Important", "1.Plan", "2.Action", and "3.Check" are replaced with the font characters. In the modification, a shaping button 701 is provided instead of the figure shaping button 501.

The figure is recognized from the stroke data items, the traced figures are detected from the recognized figures, and the traced figures are changed to the figure, whereby the figure can easily be seen. Because frequently the traced figure is formed when an important portion is emphasized, the display mode of the shaped figure is different from that of the original figure to easily distinguish the traced figure from other portions.

In the embodiment, the traced figure is detected after the recognized handwritten figure is shaped. Alternatively, the traced handwritten figure is detected with respect to the recognized handwritten figure, and the detected traced handwritten figure may be shaped. Then the handwritten figures except the traced handwritten figure may be shaped.

Various kinds of processing on a handwritten document according to the embodiment can be realized by a computer program and thus, the same effect as that in the embodiment can easily be realized only by installing the computer program through a computer readable storage medium storing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a receiver to receive first stroke data on strokes input by handwriting, at least a part of strokes in the first stroke data forming figures; and
    a display circuitry to perform a process for displaying, if at least a part of strokes of the first stroke data forming a plurality of first handwritten figures of a same kind and the plurality of first handwritten figures are drawn in substantially a same area, a first kind of a single second shaped figure as a recognition result of the first handwritten figures on a display,
    wherein at least one of a line type and a line color of the second shaped figure is different from at least one of a line type and a line color of the first handwritten figures.

2. The device of claim 1, wherein the receiver recognizes a character from the first stroke data, and
    the display processor performs processing of displaying the recognized character on the display.

3. A handwritten document processing method comprising:
    receiving, by a receiver, first stroke data on strokes input by handwriting, at least a part of strokes in the first stroke data forming figures; and
    displaying, by a display circuitry, if at least a part of strokes of the first stroke data forming a plurality of first handwritten figures of a same kind and the plurality of first handwritten figures are drawn in substantially a same area, a first kind of a single second shaped figure instead of a first kind of a plurality of first handwritten figures on a display,
    wherein at least one of a line type and a line color of the second shaped figure is different from at least one of a line type and a line color of the first handwritten figures.

4. A computer-readable, non-transitory storage medium configured to store a computer program which is executable by a computer, the computer program controlling the computer to execute functions of:
    receiving, by a receiver, first stroke data on strokes input by handwriting, at least a part of strokes in the first stroke data forming figures; and
    displaying, if at least a part of strokes of the first stroke data forming a plurality of first handwritten figures of a same kind and the plurality of first handwritten figures are drawn in substantially a same area, a first kind of a single second shaped figure instead of a first kind of a plurality of first handwritten figures on a display,
    wherein at least one of a line type and a line color of the second shaped figure is different from at least one of a line type and a line color of the first handwritten figures.

5. The method of claim 3, further comprising:
    recognizing, by the receiver, a character from the first stroke data; and
    displaying the recognized character on the display.

6. The medium of claim 4, wherein the computer program controls the computer to further execute functions of:
    recognizing a character from the first stroke data; and
    displaying the recognized character on the display.

7. The device of claim 1, further comprising:
    a generator to generate first stroke data based on a coordinate series output from a sensor when the strokes are input to the sensor,
    wherein the display circuitry displays the first handwritten figures before the second shaped figure is displayed, and displays the second shaped figure instead of the first handwritten figures.

8. The method of claim 3, further comprising:
    generating, by a generator, first stroke data based on a coordinate series output from a sensor when the strokes are input to the sensor;
    displaying, by the display circuitry, the first handwritten figures before the second shaped figure is displayed; and
    displaying the second shaped figure instead of the first handwritten figures.

9. The medium of claim 4, wherein the computer program controls the computer to further execute functions of:
    generating first stroke data based on a coordinate series output from a sensor when the strokes are input to the sensor;
    displaying the first handwritten figures before the second shaped figure is displayed; and
    displaying the second shaped figure instead of the first handwritten figures.

* * * * *